(12) United States Patent  
Häb-Umbach

(10) Patent No.: US 6,718,305 B1  
(45) Date of Patent: Apr. 6, 2004

(54) SPECIFYING A TREE STRUCTURE FOR SPEECH RECOGNIZERS USING CORRELATION BETWEEN REGRESSION CLASSES

(75) Inventor: Reinhold Häb-Umbach, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/527,279

(22) Filed: Mar. 17, 2000

(30) Foreign Application Priority Data

Mar. 19, 1999 (DE) .......................................... 199 12 405

(51) Int. Cl.[7] .......................... G10L 15/00; G10L 15/06; G10L 15/14; G06F 15/18
(52) U.S. Cl. ....................................... 704/245; 704/216
(58) Field of Search ................................. 704/245, 216, 704/236–244

(56) References Cited

U.S. PATENT DOCUMENTS

| | | | | |
|---|---|---|---|---|
| 4,590,605 A | * | 5/1986 | Hataoka et al. | 704/245 |
| 5,033,087 A | * | 7/1991 | Bahl et al. | 704/256 |
| 5,657,424 A | * | 8/1997 | Farrell et al. | 704/255 |
| 5,737,487 A | * | 4/1998 | Bellegarda et al. | 704/250 |
| 5,745,649 A | * | 4/1998 | Lubensky | 704/232 |

OTHER PUBLICATIONS

"The Generation and Use of Regression Class Trees for MLLR Adaptation", M.J.F. Gales, Aug. 1996, Cambridge Univ. Engineering Dept. (England).
K. Beulen et al, "Automatic Question Generation for Decision Tree Based State Typing", ICASSP 1998 proceedings, pp. 805–808.

* cited by examiner

Primary Examiner—Richemond Dorvil
Assistant Examiner—Donald L. Storm

(57) ABSTRACT

Disclosed is a method for use by a speech recognizer. The method includes determining a regression class tree structure for the speech recognizer, wherein the tree structure includes, representing word subunits or regression classes, as tree leaves, combining the word subunits to form tree nodes using a distance measure for the word subunits in the acoustic space, and combining regression classes to a regression class that lies closer to a tree root of the tree structure using a correlation measure, and wherein at least two of regression classes having the largest correlation parameter are combined to a new regression class that is used in the formation of the regression tree structure, instead of the two combined regression classes, to determine a regression class representing the tree root.

5 Claims, 2 Drawing Sheets

Figure 1:
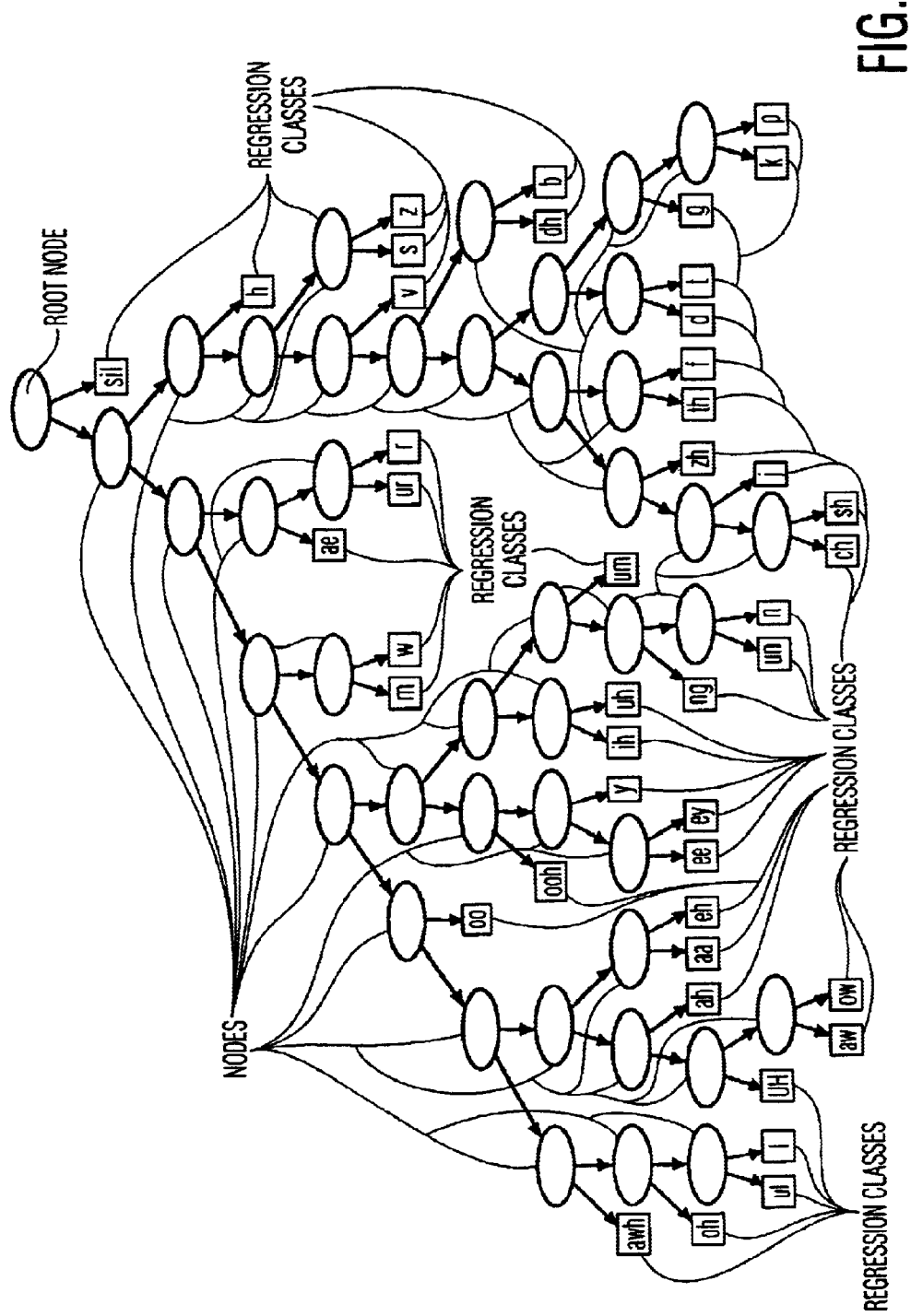

SPECIFYING A TREE STRUCTURE FOR SPEECH RECOGNIZERS USING CORRELATION BETWEEN REGRESSION CLASSES

The invention relates to a method of automatically specifying a regression class tree structure for automatic speech recognizers with tree leaves representing word subclusters, and with tree nodes combining the word subclusters in dependence on a measure or the distances of the word subclusters in the acoustic space.

The regression class tree structure can be used for speech adaptation in automatic speech recognition systems, for example, dictation systems. A further possibility of use exists in the formation of the acoustic models in speech recognition systems.

A speaker adaptation in a priori speaker-independent speech recognizers is used for adaptation to a new speaker who does not belong to the speakers who were used for the (speaker-independent) training of the speech recognizer. A speaker adaptation may reduce the error rate of the speech recognizer, which rate is often unsatisfactory due to the only limited amount of training speech data. Depending on the amount of available adaptation speech data, the error rate of the speech recognizer, which can thus be adapted better to the respective speaker, will diminish. But also when there is only a small amount of adaptation data available will the speech recognizer be noticeably adapted to the respective speaker, i.e. have a recognizably reduced error rate.

From M. J. F. Gales "The generation and use of regression class trees for MLLR adaptations", August 1996, Cambridge University (England), ftp address: svr-ftp.eng.cam.ac.uk—hereinafter referenced as [1]—it is known to use such regression class tree structures for speaker adaptation of speech recognizers which are a priori speaker-independent. The acoustic models of speech recognizers based on Hidden-Markov-Models (HMM) are then adapted by means of a linear transformation for which the HMM probability distributions are adapted. The transformation matrix used therefor is computed from the adaptation data by means of a Maximum Likelihood Estimate, i.e. by means of probability maximization. For the adaptation technique described it is a decisive point to suitably combine the word subclusters, referenced components in [1], of the basic speech corpus and associated Hidden-Markov-Models in clusters which are each assigned to exactly one transformation matrix. By means of the tree structure are determined regression classes that represent clusters of word subclusters. The tree leaves represent word subclusters which are to be considered basic regression classes. The tree nodes (which represent clusters of word subclusters) combine all the more word subclusters or regression classes as the tree nodes are closer to the tree roots. The regression classes used for the adaptation to the speaker are respectively determined by the number of available adaptation data. The more adaptation data are available, the closer lie the regression classes used for the speaker adaptation to the tree leaves and the more remote are they situated from the tree roots.

For the construction of the regression class tree structure, two approaches are described in [1]. The first estimate implies the use of expert knowledge with respect to the phonetic structure of the language used. Such knowledge is, however, not always readily available for all languages/corpora of languages. It is suggested, for example, to combine nasal sounds in one regression class. At a stage lying further below, i.e. further away from the tree root, for example, a subdivision into phones could be made. The second estimate has the effect that the combination of word subclusters and regression classes on which nearness to each other in the acoustic space is made dependent, irrespective of the phones they belong to. With this data-controlled estimate with an automatic construction of the regression class tree structure, no expert knowledge is necessary. However, the clusters found can no longer be assigned to phonetic classes (for example, nasals), i.e. a graphic interpretation of the classes is no longer possible. Both estimates are referenced in [1] as not unconditionally leading to optimum results. Recently, the probability of the adaptation data has been focused on maximizing them. A globally optimum tree structure can normally not be determined. However, a local optimization with respect to the determination of the individual tree nodes could be achieved.

It is an object of the invention to provide a data-driven estimate leading to a satisfactory error rate of the speech recognizer and linked to an automatic construction of the regression class tree structure.

The object is achieved in that the combination of regression classes to a regression class that lies closer to the tree root is made on the basis of a correlation parameter.

This estimate led to speech recognizer error rates which were very close to the error rates obtained when a regression class tree structure was used whose construction was not effected automatically but was exclusively based on expert knowledge.

A preferred embodiment of the method according to the invention comprises that, when the tree structure is initially determined, each word subcluster forms a basic regression class, that, subsequently, successive pairs of regression classes having the largest correlation parameter in the respective step are combined to a new regression class which is taken into account in the next steps of the formation of the tree structure instead of the two combined regression classes, until a regression class representing the tree root is formed. The tree structure is thus determined recursively based on the basic regression classes/word subclusters.

More specifically, there is provided that for determining the correlation parameter between two word subclusters, a correlation coefficient is formed in accordance with:

$$\rho_{ij} = \frac{R_{ij}}{\sqrt{R_{ii}}\sqrt{R_{jj}}} \text{ with } R_{ij} = \frac{1}{M}\sum_{m=1}^{M}\left(\mu_i^{(m)} - \frac{1}{M}\sum_{m=1}^{M}\mu_i^{(m)}\right)^T\left(\mu_j^{(m)} - \frac{1}{M}\sum_{m=1}^{M}\mu_j^{(m)}\right)$$

with
- i and j as indices for the two word subclusters which are still considered for a combination to a new regression class;
- M as the number of speakers during the training of the speech recognizer;
- $\mu_i^{(m)}$ as the mean value vector for the $i^{th}$ word subcluster and $\mu_j^{(m)}$ as the mean value vector for the $j^{th}$ word subcluster, the components of the mean value vectors describing the mean values of output distributions of Hidden-Markov-Models used for describing the word subclusters, and in that, when the two word subclusters described by Hidden-Markov-Models are combined to a new regression class, for this new regression class an associated mean value vector is formed which is used for the respective calculation of further correlation coefficients relating to this new regression class and one or more other regression classes, by a linear combination of mean value vectors assigned to the two word subclusters.

Preferably, phonemes are provided as word subclusters. These phonemes lead as basic regression classes to tree structures which are particularly suitable for the speaker adaptation of speech recognizers. A further refinement of the tree structure is not necessary, usually because of the generally limited number of adaptation data.

A first preferred application of the regression class tree structure constructed with the method according to the invention comprises that the regression class tree structure is used for a speaker adaptation of a priori speaker-independent automatic speech recognizers and that their regression classes which, on the basis of the same adaptation data, combine Hidden-Markov-Models of word subclusters to be adapted, are used in dependence on the number of available speaker adaptation data.

A second use of the regression class tree structure constructed by the method according to the invention provides that, in dependence on the tree structure, context-dependent word subclusters are assigned to acoustic models while context categories on which the assignment is based are determined by means of the tree structure. Context-dependent word subclusters may be understood to be, for example, triphones. In a context category are then combined context phonemes for which it is assumed that they have the same or substantially the same influence on the pronunciation of a certain core phoneme. Such context categories are assumed to be, for example, the groups of vocals, plosives, fricatives, . . . In K. Beulen, H. Ney "Automatic question generation for decision tree based state tying", ICASSP 1998 proceedings, pp. 805–808 (to be referenced [2] hereinafter), such context categories are assigned to phonetic questions by means of which the assignment of triphon-HMM-states to acoustic models incorporated in the speech recognizer is effected. These phonetic questions can now be easily determined by means of a regression class tree structure constructed with the method according to the invention.

The invention also relates to a speech recognition system whose speech recognition procedures use a regression tree structure constructed with the method according to the invention, more particularly in the framework of either of the two applications indicated.

Figure 2:
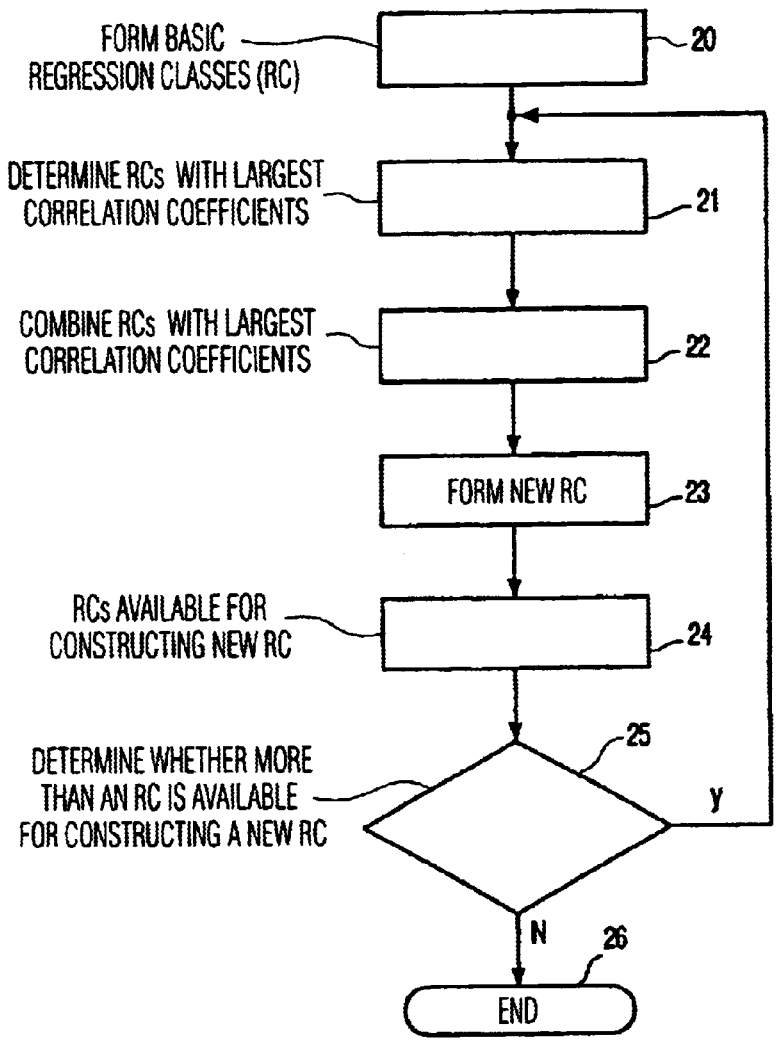
Figure 3:
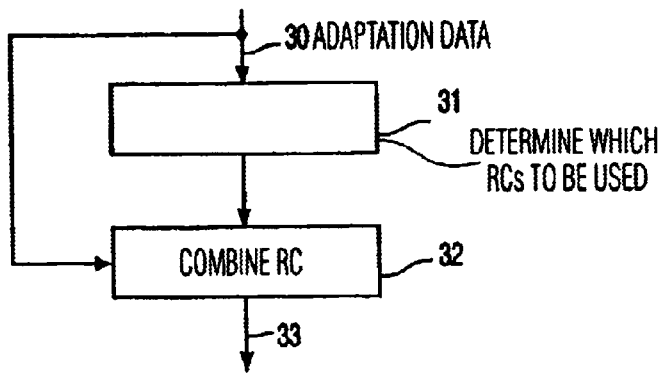

Examples of embodiment of the invention will be further explained in the following with reference to the drawings in which:

FIG. 1 shows a regression class tree structure which was constructed in accordance with the method according to the invention, FIG. 2 shows a flow chart serving as an explanation of the construction of the regression class tree structure shown in FIG. 1, and FIG. 3 shows a flow chart with the aid of which a speaker adaptation in a speech recognition system is described anew.

In the regression class tree structure shown in FIG. 1 are used as basic classes word subclusters shown in rectangles. In the present case the word subclusters have phonemes which are entered in FIG. 1 in the form of the notation of the DRAGON lexicon. The word subclusters representing basic regression classes are at the same time the leaves of the tree structure shown. The tree nodes shown by ellipses represent regression classes that combine two respective (base) regression classes. To begin the construction of the tree structure, the base regression classes are started from. Then, each time two regression classes having the respective largest correlation parameter are combined to a new regression class by means of a new tree node that is closer to the tree root than the two combined regression classes. In the following steps of the construction of the tree structure, this new regression class is taken into account instead of the two combined regression classes. The described combination of pairs of regression classes is continued until a regression class representing the tree root is formed. In the present case either of the two regression classes combined to the tree root is representative of the "word subcluster" speech pause (here referenced sil). The correlation parameter between two regression classes provides a good estimate for their acoustic similarity. As an alternative for the use of a correlation parameter could also be used, for example, the Euclidean distance as a distance measure for pairs of regression classes. A regression class tree structure generated on the basis of this, however, leads to poorer error rates as is the case when a correlation parameter is used. For determining the correlation parameter between two word subclusters, a correlation coefficient is formed in the present case according to the formula:

$$\rho_{ij} = \frac{R_{ij}}{\sqrt{R_{ii}}\sqrt{R_{jj}}} \text{ with } R_{ij} = \frac{1}{M}\sum_{m=1}^{M}\left(\mu_i^{(m)} - \frac{1}{M}\sum_{m=1}^{M}\mu_i^{(m)}\right)^T\left(\mu_j^{(m)} - \frac{1}{M}\sum_{m=1}^{M}\mu_j^{(m)}\right)$$

In this formula i and j represent indices for the two word subclusters which are still considered for a combination to a new regression class and whose distance in the acoustic space is to be estimated. M is the number of speakers during the training of the speech recognizer. $\mu_i^{(m)}$ is the mean value vector for the $i^{th}$ word subcluster and $\mu_j^{(m)}$ is the mean value vector for the $j^{th}$ word subcluster, while the components of the mean value vectors represent the mean values of output distributions of Hidden-Markov-Models used for describing word subclusters. When the two word subclusters that have the largest correlation coefficients $p_{ij}$ are combined to a new regression class, this new regression class is assigned a new mean value vector to be determined. This vector is used for the respective calculation of further correlation coefficients relating to this new regression class and to the further regression classes not yet combined by a tree node. The vector is formed by linear combinations of the mean value vectors assigned to the two word subclusters. The weight factors in the linear combination are then determined on the basis of the number of occurrences of the two combined word subclusters in the training material while, more particularly, a proportional relation between number of occurrences and weight factor of the linear combination is assumed. Each ellipse in FIG. 1 is assigned a certain correlation coefficient in accordance with the above embodiments.

By means of the flow chart shown in FIG. 2, the formation of the regression class tree structure as shown in FIG. 1 will be clarified additionally. First, in a first step 20, the associated correlation coefficients $p_{ij}$ according to the formula shown above is formed for all possible pairs of word subclusters, i.e. basic regression classes, which are phonemes here. In a step 21 is determined the correlation coefficient $p_{ij}$ that has the largest value. The two word subclusters/regression classes that have the largest correlation coefficients are now combined in a step 22 to a new regression class, i.e. a new tree node, or a new cluster, respectively. In a step 23 is now formed a new mean value vector $\mu^{(m)}$ for the new regression class by the linear combination of the mean value vectors $\mu_i^{(m)}$ and $\mu_j^{(m)}$ belonging to the two combined regression classes. The two combined regression classes are now as single regression classes no longer considered for the formation of a new regression class, but only as part of a regression class cluster containing the combined regression classes. Subsequently, in a step 24, all the correlation coefficients relating to the new regression class and all the regression classes still available for constructing a new regression class are determined. In a subsequent query 25 there is determined whether there is more than one regression class available for constructing a new regression class, i.e. there is checked whether the tree root has not yet been reached. If it has not, the steps 21 to 24 are run through once more. If, during the query in step 25, it turns out that the tree root has been reached indeed, the end of the algorithm is reached with step 26.

With reference to FIG. 3 will now be explained hereinafter a preferred implementation of the regression class tree structure according to the invention, that is, the use during a speaker adaptation of a priori speaker-independent automatic speech recognizers. It is assumed that adaptation data 30 and a regression class tree structure constructed from the training data used during the training of the speech recognizer are available. Depending on the amount of adaptation data available there is determined, in step 31, which regression classes are to be used as basic data for the speaker adaptation. The more adaptation data are available, the more remote the regression classes used will be from the tree root. In step 32 a common adaptation of the acoustic models of the word subclusters which are combined by the respective regression class will be made for each regression class that can be used. The adaptation is effected by multiplying the respective mean value vectors $\mu^{(m)}$ by a common transformation matrix. A common transformation matrix is accordingly used for all the word subclusters combined by means of a regression class. The calculation of such a transformation matrix and the speaker adaptation with the aid of such a matrix is described in [1]. As a result, this will not be further discussed here.

A further preferred application of the regression class tree structure constructed according to the invention lies in the fact that, in dependence on the tree structure, triphones are combined to acoustic contexts for which a respective Hidden-Markov-Model is estimated. By means of decision trees or other clustering methods, similar acoustic contexts are identified and combined. For these similar acoustic contexts a respective Hidden-Markov-Model is estimated. A typical system has, for example, about 3000 acoustic contexts for which each time a separate Hidden-Markov-Model is estimated. When—as is customary—decision trees are used for determining contexts, a certain number of questions are posed, which are posed with respect to all possible acoustic contexts (see [2]). For example, a question could be whether the context to the left of the phoneme that has just been considered is a nasal or not. For this purpose, however, phonetic expert knowledge with respect to the basic language has been used so far, i.e. in the example described one should particularly know what a nasal actually is. With the regression class tree structure according to the invention, groups of phonemes are obtained and the questions can now be directed to the fact whether a certain phoneme belongs to these groups of phonemes.

I claim:

1. A method for use by a speech recognizer, the method comprising the steps of:

determining a regression class tree structure for the speech recognizers, wherein the tree structure includes, representing word subunits or regression classes, as tree leaves, combining the word subunits to form tree nodes using a distance measure for the word subunits in the acoustic space, and combining regression classes to a regression class that lies closer to a tree root of the tree structure using a correlation measure, and wherein at least two of regression classes having the largest correlation parameter are combined to a new regression class that is used in the formation of the regression tree structure, instead of the two combined regression classes, to determine a repression class representing the tree root.

2. The method as claimed in claim 1, wherein in the step of determining the correlation measure between two word subunits, a correlation coefficient is formed in accordance with:

$$\rho_{ij} = \frac{R_{ij}}{\sqrt{R_{ii}}\sqrt{R_{jj}}} \text{ with } R_{ij} = \frac{1}{M}\sum_{m=1}^{M}\left(\mu_i^{(m)} - \frac{1}{M}\sum_{m=1}^{M}\mu_i^{(m)}\right)^T\left(\mu_j^{(m)} - \frac{1}{M}\sum_{m=1}^{M}\mu_j^{(m)}\right)$$

with i and j as indices for the two word subunits which are still considered for a combination to a new regression class;

M as the number of speakers during the training of the speech recognizer;

$\mu_i^{(m)}$ as the mean value vector for the i$^{th}$ word subunit and $\mu_j^{(m)}$ as the mean value vector for the j$^{th}$ word subunit, the components of the mean value vectors describing the mean values of emission distributions of Hidden-Markov-Models used for describing the word subunits, and in that, when the two word subunits described by Hidden-Markov-Models are combined to a new regression class, for this new regression class an associated mean value vector is formed which is used for the respective calculation of further correlation coefficients relating to this new regression class and one or more other regression classes, by a linear combination of mean value vectors assigned to the two word subunits.

3. The method as claimed in claim 1, characterized in that the word subunits are phonemes.

4. An automatic speech recognizer comprising:

a processor configured with the regression class tree structure constructed as claimed in claim 1, wherein the regression class tree structure is used for a speaker adaptation of a priori speaker-independent automatic speech recognizers and that their regression classes that combine Hidden-Markov-Models of word subunits to be adapted, are used in dependence on the quantity of available speaker adaptation data.

5. An automatic speech recognizer comprising:

a processor configured with the regression class tree structure constructed as claimed in claim 1, wherein context-dependent word subunits are assigned to acoustic models while context categories on which the assignment is based are determined by means of the tree structure.

\* \* \* \* \*